July 26, 1927.
O. C. TRAVER
1,637,032
PROTECTIVE DEVICE
Filed May 13, 1922
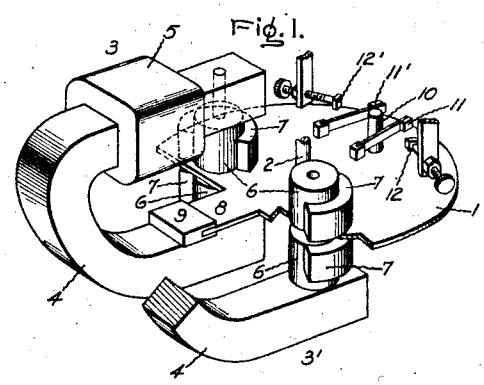
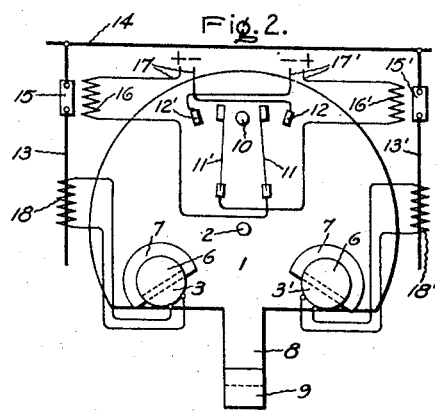
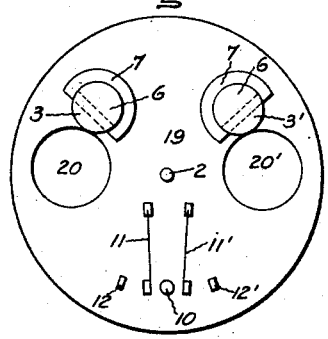
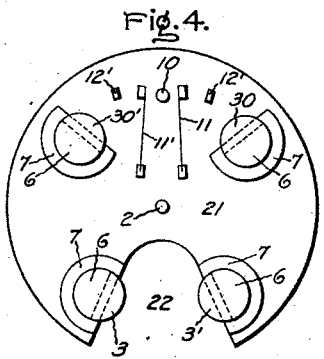
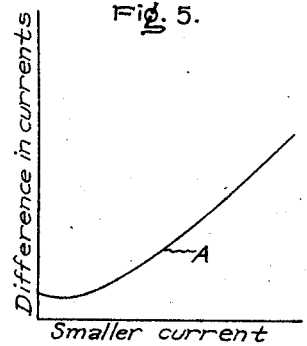
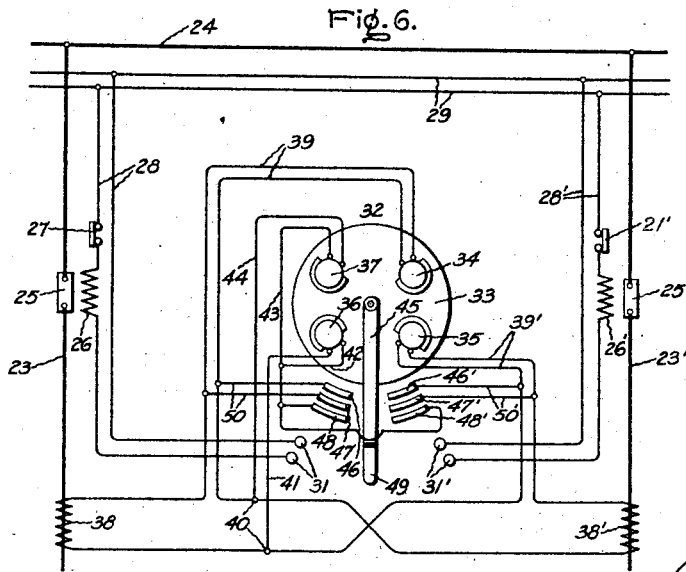
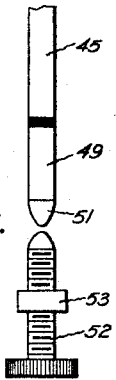
Inventor:
Oliver C. Traver,
by Albert ?. Davis
His Attorney.

Patented July 26, 1927.

1,637,032

UNITED STATES PATENT OFFICE.

OLIVER C. TRAVER, OF SCHENECTADY, NEW YORK, ASSIGNOR TO GENERAL ELECTRIC COMPANY, A CORPORATION OF NEW YORK.

PROTECTIVE DEVICE.

Application filed May 13, 1922. Serial No. 560,687.

My invention relates to protective devices and arrangements for alternating current electric systems and particularly for electric systems wherein an electric quantity at one point of a system is balanced against a similar electric quantity at another point of the system for protective purposes. An object of my invention is to provide for such systems an improved protective arrangement having a discriminating action dependent upon the relative values of the quantities compared and independent of the directions thereof. Another object of my invention is to provide an improved differential relay of the induction type for comparing the values of two similar electric quantities irrespective of the directions thereof. A further object of my invention is to provide an improved differential relay of the induction type which is operative in response to a predetermined ratio of the values of two similar electric quantities with a discriminating action dependent upon the relative values thereof.

My invention will be better understood from the following description taken in connection with the accompanying sheet of drawings, and its scope will be pointed out in the appended claims.

Fig. 1 illustrates an embodiment of my invention in perspective with parts broken away for clearness; Fig. 2 illustrates diagrammatically a protective system for two transmission lines, embodying the form of my invention shown in Fig. 1; Fig. 3 illustrates diagrammatically a modification of my invention; Fig. 4 illustrates diagrammatically another modification of my invention; Fig. 5 illustrates graphically the type of characteristic curve of relays constructed in accordance with my invention; Fig. 6 illustrates diagrammatically a protective system for two transmission lines embodying a modification of my invention; and Fig. 7 is a detail of a magnetic arrangement for damping the oscillations of a movable member.

The embodiment of my invention illustrated in Fig. 1 is a differential relay of the induction type, comprising a movable member or armature such as a disk 1 or its equivalent of non-magnetic but suitable electric current conducting material, secured to a shaft 2 supported in suitable bearings and rotatable therein in two directions. For controlling the movement of the disk 1, I provide a plurality of electromagnetic torque-producing or motor elements 3, 3' arranged to exert opposing torques on the disk 1. the motor elements illustrated are of the electromagnetic shaded pole type comprising a magnetic member or core 4, provided with an energizing winding 5 and having poles 6, provided with closed or short-circuited windings 7 and inductively associated with the disk 1. In Fig. 1, a portion of the magnetic core 4 and the energizing winding 5 of the torque-producing element 3' in the foreground of the perspective and a portion of the disk 1 between the poles 7 of this element are broken away for clearness in illustration. The direction of the torque exerted on a disk inductively associated with a motor element of the type illustrated is independent of the direction of the current in the energizing winding 5 thereof, but the intensity of the torque is dependent upon the intensity of the current in the energizing winding 5, and upon the relative angular positions of the closed or short-circuited pole windings 7. However, the direction of the torque is dependent upon the position of the closed or short-circuited pole windings 7 with respect to a plane through the axis of rotation of the disk and the polar axis of the poles inductively associated with the disk. Looking down on the disk 1 as illustrated in Fig. 1, the motor element 3 is arranged, when energized, to exert a torque on the disk 1, tending to turn it clockwise, and the motor element 3' is arranged, when energized, to exert a torque on the disk 1, tending to turn it counterclockwise. Obviously, if the disk 1 were a circle having its material uniformly distributed, and the motor elements 3, 3' were symmetrically arranged with respect to the disk and its axis of rotation, and the torques exerted by the motor elements were equal, the disk 1 would tend to remain stationary, but a difference between the torques sufficient merely to start the disk would rotate the disk in a direction determined by the greater or predominating torque.

In certain protective arrangements for electric systems wherein similar electric quantities at two points of a system are balanced against each other for protective purposes, the protective apparatus should not respond to a mere difference between the intensities of the quantities compared, as even in normal operation the quantities may differ by varying amounts due to the inherent differences between the electric characteristics of different parts of the system. Also in some electric systems wherein balanced protective arrangements are desirable and wherein either one or both of the similar electric quantities compared, for example, currents, voltages, etc., are subject to reversals in direction, it is not desirable that the protective apparatus function on a mere difference between the quantities resulting from the relative directions thereof. Moreover, protective apparatus which functions with a discriminating or selective action is desirable.

According to my invention, I provide protective apparatus and arrangements which function with a discriminating action in response to a predetermined ratio of the intensities of the electric quantities compared irrespective of the relative directions of the quantities. For example, where the current at one point of an electric system is compared with the current at another point of the system, the ratio of the intensities of the greater of the currents to the smaller thereof, irrespective of their directions, must exceed a predetermined amount, and the circuit of either that part of the system carrying the greater current or that part of the system carrying the smaller current may be controlled as desired. The principle of my invention may also be expressed in another way, which is that as the intensity of the smaller of the currents increases, the difference between the intensities of the currents must increase, and I prefer to approach a condition such that the intensity of one of the currents must exceed the intensity of the other by an amount which is substantially directly proportional to the intensity of the smaller current. This feature is illustrated graphically in Fig. 5, wherein I have shown a curve A which is typical of the characteristic curves of protective apparatus constructed in accordance with my invention, the curve being plotted on coordinate axes representing the intensity of the smaller of the currents and the difference between the intensities thereof, respectively.

As heretofore pointed out in connection with the description of Fig. 1, a circular disk having the material thereof uniformly distributed with respect to the axis of rotation of the disk and the poles of the motor elements would be started rotating and would continue to rotate merely on a difference between the torques, that is to say merely on a change in the intensity of the current in the energizing winding 5 of one of the motor elements 3, 3'. Therefore, in accordance with my invention, I so dispose or arrange the material of the disk 1 relatively to the poles of the motor elements 3, 3' that upon the occurrence of a difference between the torques, the movement of the disk 1 tends to equilibrate the torques, that is to say the greater or predominating torque is decreased, and the smaller torque increased. One way of obtaining a suitable disposition of the material in the disk to obtain this action is illustrated in Fig. 1, wherein a substantially segmental portion of the disk adjacent the poles of the motor elements 3, 3' is removed. Preferably I leave a small intermediate strip 8 or provide an extending portion to which is secured a suitable counterbalance or weight 9 to compensate for the weight of the material removed so as to maintain a mechanical balance of the rotatable parts. Assuming first that the torques exerted on the disk 1 by the motor elements 3, 3' are equal, the disk will take the position shown in Fig. 1. Upon the occurrence of a difference between the torques, due, for example, to an increase in the intensity of the current in the energizing winding 5 of the motor element 3, the torque exerted by this element will predominate and overcome the torque exerted by the motor element 3', and the disk 1 will be caused to start rotating clockwise. There will thus be a decreasing area of the disk 1 presented adjacent the poles 7 of the motor element 3 thereby decreasing the torque of this element since the currents induced in the disk and the flux of the motor element 3 cutting the disk 1 will be decreased, but an increasing area of the disk 1 will be presented adjacent the poles 7 of the motor element 3' thereby increasing the torque of this element since the currents induced in the disk and the flux of the motor element 3' cutting the disk will be increased. Consequently, movement of the disk 1 tends to equilibrate the torques so that the movement of the disk is limited in extent and the disk comes to rest at some intermediate position. If the difference between the torques exceeds a predetermined value, in accordance with the principles of my invention, the disk 1 will be turned sufficiently in one direction or the other according to the direction of the predominating torque so that suitable means, such as a pin 10 secured to the disk 1 will actuate one or the other of a pair of preferably resiliently mounted movable contact controlling members 11, 11' to contact controlling position to engage its cooperating contact 12 or 12', respectively.

The torque exerted on an inductively associated disk by an electromagnetic torque producing element of the type illustrated in Fig. 1 is substantially proportional to the square of the current in the energizing winding thereof, the proportionality factor depending upon the features of construction of the electromagnetic shaded pole element and its relation to the disk and the disposition of the material thereof relatively to the poles of the element. Consequently, by my invention, I vary the proportionality factor and thus obtain a substantially linear relation between the difference between the intensities of two electric quantities and the intensity of the smaller thereof as illustrated in Fig. 5. Since the proportionality factor is dependent upon the features of construction of the electromagnetic torque-producing element, I may construct the torque elements to balance a current of one frequency against a current of another frequency to protect, for example, a frequency changer, as in an actual installation of my invention where a 30 cycle current is balanced against a 60 cycle current to protect the frequency changer. Thus, in accordance with the details of construction of the motor elements 3, 3', my relay can be used in any balanced arrangement irrespective of phase or frequency. My relay is thus adapted to a variety of applications in connection with balanced protective arrangements. For example, the current or the voltage in one phase of an electric system may be balanced against the current or the voltage in any other phase of the system, or the current in one of a pair of transmission lines may be balanced against the current in the other line. I may also balance the watts or power at one point in an electric system against the watts or power at another point in the system. In this case, the motor elements 3, 3' would comprise the usual type of wattmeter motor element. Since the direction of the torque exerted by a wattmeter motor element is dependent upon the direction of power flow, the action of the relay with such elements would not be independent of the relative directions of power and satisfactory discriminating action would be obtained only when the relative directions of power at the two points remain unchanged.

From what has preceded, it will be obvious that the angular movement of the disk, that is its movement tending to equilibrate the torques of the opposing motor elements, varies with the ratio of the currents in the energizing windings 5 of the motor elements 3, 3'. Consequently, the characteristic curve A of Fig. 5 of the relay may be varied; that is to say, its slope increased or decreased by increasing or decreasing the amount of angular movement the disk must make in order to move one or the other of the contact-controlling members 11, 11' into engagement with their respective contacts 12, 12'. For this purpose the contacts 12, 12' may be adjustably mounted as shown in Fig. 1. Consequently, by increasing the distance between the initial positions of contact-controlling members 11, 11' and their respective contacts 12, 12', the angular movement of the disk in moving to contact-controlling position will be increased and, therefore, the steepness or slope of the characteristic curve will be increased; that is to say, the relay will function upon a greater value of the ratio of the greater current to the smaller current, or, in other words, for a given value of the smaller current a greater difference between the currents will be necessary to move the relay to contact-controlling position.

In Fig. 2, I have illustrated in a single line diagram for clearness, a protective system embodying the form of my relay shown in Fig. 1. Also for clearness, the relay is illustrated diagrammatically and only the shaded poles 6 with their short-circuited windings 7 of the motor elements 3, 3' are shown. The protective system shown in Fig. 2 comprises two parallel lines 13, 13' connected to a common bus 14 through suitable circuit interrupting means such as oil circuit breakers 15, 15' provided with trip coils 16, 16' whose control circuits 17, 17' are arranged to be controlled by the movable contact-controlling members 11, 11' and their cooperating contacts 12, 12'. Associated with the lines 13, 13' are current transformers 18, 18', respectively, for supplying current to the energizing windings 5 of the motor elements 3, 3'. For clearness, the windings 5 are not shown, and the terminals of the transformers 18, 18' are merely shown connected to the motor elements indicated generally as 3, 3'. Each of the motor elements 3, 3' is, therefore, energized independently of the other, and because of the construction of the relay as heretofore set forth, the action thereof is dependent only upon the relative intensities of the currents in the two lines in accordance with a characteristic curve of the type shown in Fig. 5. Thus, for example, assuming that the currents in lines 13, 13' are such as to cause the motor elements 3, 3' to exert torques of equal intensity on the disk 1, it will take the position shown relatively to the poles of the motor elements 3, 3'. Assuming now that the current in line 13' decreases or the current in line 13 increases, then motor element 3 predominates and tends to turn the disk 1 clockwise. Movement of the disk 1, however, as heretofore explained, tends to equilibrate the torques exerted thereon by the motor elements 3, 3', but if the difference between the torques exceeds a value determined in accordance with the principle of my invention, the disk will be rotated to contact-controlling position. In this illustrative case, the clockwise rotation of the disk would cause the pin 10 to actuate contact-controlling member 11 to engage its cooperating contact 12, thus completing the control circuit 17 of the trip coil 16 of circuit breaker 15, thereby causing it to be opened and interrupting the circuit of the line 13 carrying the greater current. It will be noted that upon the opening of the circuit of line 13, the current in the energizing winding 5 of motor element 3 is reduced to zero and the torque exerted by this element therefore becomes zero. Consequently, motor element 3' predominates and turns the disk 1 counterclockwise. As the disk 1 is turned counterclockwise, the torque exerted thereon by the motor element 3' of course decreases as less and less area of the disk is presented adjacent the pole faces of this element. The disk 1, therefore, comes to rest before being turned far enough to actuate contact-controlling member 11' to engage its cooperating contact 12' unless the current in the line 13', that is to say the difference between the intensities of the currents in the lines 13, 13', since the current in line 13 is now zero, exceeds a predetermined value. Thus, with one of the currents zero or relatively small, I prefer to depart in certain cases somewhat from the substantially linear relation between the intensity of the smaller current and the difference between the intensities of the two currents. This feature is shown in Fig. 5 by the substantially horizontal portion of the curve A near the origin or intersection of the coordinate axes. It will be evident that the relay is thus not operative to cut out the line 13' subsequent to the interruption of line 13 until the current in line 13' exceeds a predetermined value and continuity of service will be maintained. Moreover, the relay will function as an overload relay to protect the line still in service, that is to say in this illustrative case the line 13'.

Obviously, either of the motor elements 3, 3' can be considered as a restraining element and the other as an operating element. Moreover, since the motor elements 3, 3' are independently energized, it will be obvious that the restraining and operating effects they produce are independent of the relative directions of currents in the lines 13, 13'. Therefore, if either one or both of the lines 13, 13' are subjected to a reversal in power, as they may be when fed from both ends, the relay will still function in accordance with the characteristic curve shown in Fig. 5 since it is the numerical difference between the intensities of the quantities compared which governs the operation of the relay. In other words, if both of the lines 13, 13' were feeding the bus 14 and there were a source of power feeding this bus, then if power is reversed in one of the lines 13, 13' the relay is not operative until the numerical difference between the intensities of the currents exceeds an amount which is substantially directly proportional to the intensity of the smaller current.

In Fig. 3, which diagrammatically illustrates a modification of the form of my invention shown in Fig. 1, and in which the motor elements are indicated generally as 3, 3', the material of the rotatable element or disk 19 is so disposed relatively to the poles of the motor elements by means of holes 20, 20' in the disk 19, that movement of the disk in either direction presents an increasing area of the disk adjacent the poles of one of the motor elements and a decreasing area of the disk adjacent the poles of the other element. As before, motor element 3 is arranged to exert a torque tending to turn the disk 19 clockwise, and motor element 3' to exert a torque tending to turn the disk 19 counterclockwise. Consequently, upon the occurrence of a difference between the torques exerted by these elements, the resulting movement of the disk 19 tends to equilibrate the torques so that an increasing difference between the intensities of the currents in the energizing winding of these elements as the smaller current increases will be necessary in order that the disk may be moved to contact-controlling position.

In Fig. 4, I have illustrated another modification of my invention comprising a rotatably mounted member or disk 21 arranged to have its movement controlled by a plurality of motor elements indicated generally as 3, 3', 30 and 30' which may be of the type illustrated in Fig. 1. Two of these elements 3 and 30 are arranged to exert torques on the disk 21 tending to turn it clockwise, and the other two elements 3' and 30' are arranged to exert torques on the disk 21 tending to turn it counterclockwise. The energizing windings of each pair of motor elements 3, 30 or 3', 30' may be connected in series, parallel or otherwise to suitable sources of supply such as current or potential transformers. As before, the material in the rotatable element or disk 21 is so disposed relatively to the poles of the motor elements 3, 3' that upon the occurrence of a difference between the torques exerted by the pairs of elements 3, 30 and 3', 30', the movement of the disk tends to equilibrate the torques. In this modification of my invention, I reduce the area of the disk adjacent the poles 6 of the motor elements 3, 3' by cutting out a portion 22 of the disk substantially in the shape of a sector of a circle, between the motor elements 3, 3' so that upon movement of the disk an increasing area thereof is presented adjacent the poles of one of the motor elements 3, 3' and a decreasing area adjacent the other. Thus, for example, if the torques exerted by the two pairs of motor elements 3, 30 and 3', 30' differ and the elements 3, 30 predominate, the disk 21 will be rotated clockwise and the effect of element 3 is decreased and may be substantially eliminated, while the effect of element 3' is increased so that elements 3' and 30' are opposed by element 30 alone. By this arrangement. I have another form of my invention adapted to function, if desired, in accordance with a characteristic curve of the type illustrated in Fig. 5.

Although I have shown several modifications of my relay with the material in the disk disposed in various ways in order to have the relay function in accordance with the principle of my invention, I do not limit myself to the particular forms or shapes of disk shown, as obviously the material in the disk may be disposed in many other ways than those illustrated so that upon movement of the disk an increasing amount of the material thereof may be presented adjacent one torque element and a decreasing amount adjacent another torque element opposing the first element. In fact, I may so arrange a relay of the induction type in a protective system as to operate in accordance with the principle of my invention even though the disk is a circle and the material thereof is uniformly distributed throughout as illustrated in Fig. 6.

In the modification of my invention illustrated in Fig. 6, I have shown in a single line diagram for clearness, a protective system for two transmission lines 23, 23' connected to a common bus 24 through suitable circuit interrupting means 25, 25', respectively, such as oil circuit breakers provided with trip coils 26, 26' and preferably with auxiliary switches 27, 27' in the control circuits 28, 28' of the trip coils, the control circuits 28, 28' being connected to a control bus 29 and the auxiliary switches 27, 27' being closed when the respective circuit breakers 25, 25' are closed. The control circuits 28, 28' of the trip coils 26, 26' are arranged to be controlled through suitable contacts 31, 31', respectively, by means of a relay 32 embodying my invention and shown diagrammatically for clearness. The relay 32 comprises a rotatably mounted member or disk 33 which in this case may be a circle. For controlling the movement of the disk 33, I provide a plurality of motor elements indicated generally as 34, 35, 36 and 37 which may be of the type illustrated in Fig. 1 and for clearness these motor elements are represented merely by their shaded poles. Motor elements 34 and 36 are arranged so that when energized they will exert torques tending to turn the disk 33 clockwise, and motor elements 35 and 37 are arranged so that when energized they will exert torques tending to turn the disk 33 counterclockwise. For energizing the motor elements 34, 35, 36 and 37 in response to conditions in the lines 23, 23', I provide current transformers 38, 38' associated with the lines 23, 23', respectively, and cross-connected for circulating currents when the directions of the currents in the lines 23, 23' are the same. The energizing windings, not shown, of the motor elements 34 and 35 are arranged in series with the current transformers 38 and 38', respectively, through circuits 39, 39', and the energizing windings, not shown, of motor elements 36 and 37 are connected in series across equipotential points 40 of the current transformer circuit through a circuit including conductors 41, 42, 43 and 44. For controlling the energizing circuits of the motor elements and also the trip coil control circuits, I provide a contact-controlling member 45 associated with the disk 33 and movable thereby in one direction or the other to engage and slide over contact members 46, 47, 48 or 46', 47', 48' to control the energizing circuits of the motor elements and to close contacts 31 or 31' in the trip coil control circuits 28, 28'. Preferably, the contact-controlling member 45 comprises a rigidly associated part 49, insulated from the body of the member, for controlling contacts 31, 31'. Contacts 46, 47 are arranged in circuit through conductors 50 to conductors 39 for short-circuiting motor element 34, and contacts 46', 47' are arranged in circuit through conductors 50' to conductors 39' for short-circuiting motor element 35. Contacts 48, 48' are interconnected with each other and to conductors 42 and 43 so that when contact-controlling member 45 is moved to the left contact 48 in cooperation with contact 46 short circuits motor element 37, and when contact-controlling member 45 is moved to the right contact 48' in cooperation with contact 46' short circuits motor element 36.

Assuming now that the intensities of the currents in the lines 23, 23' are substantially equal, then motor elements 34 and 35 are equally energized and will exert substantially equal opposing torques on the disk 33, also the points 40 in the current transformer circuit will be at the same potential, and no current will flow in the circuit 41, 42, 43, 44, so that the torque of each of the motor elements 36, 37 is substantially zero. The disk 33 will therefore tend to remain stationary in the position shown. Assuming now that the intensity of the current in line 23 increases, then the points 40 will no longer be at the same potential, and the difference between the intensities of the currents in lines 23, 23' will flow through the circuit 41, 42, 43, 44 energizing both of the motor elements 36, 37 equally, but as they are arranged for opposing torques, they will not tend to move the disk 33. Motor element 34, however, will be energized in response to the intensity of the current in line 23, and motor element 35 in response to the intensity of the current in line 23'. Consequently, the disk 33 will be moved clockwise and the contact-controlling member 45 will engage and slide over contacts 46, 47, 48 thereby short-circuiting motor elements 34 and 37. This then leaves motor elements 35 and 36 exerting opposing torques effective to control the movement of the disk 33. The torque of motor element 35 is, however, proportional to the square of the smaller current, and the torque of the motor element 36 is proportional to the square of the difference between the currents. Therefore, for equal torques the ratio of the difference between the currents to the smaller current depends upon the ratio of the square roots of the proportionality factors which in this case remain unchanged and the relay functions in accordance with the principle of my invention, since the ratio of the greater of the currents to the smaller must exceed a predetermined value. If this value is exceeded, that is to say, motor element 36 overcomes motor element 35, then the contact-controlling member 45 is moved to the left far enough to close contacts 31, thereby completing the circuit 28 of trip coil 26 and causing the opening of the circuit breaker 25 in the line carrying the greater current. Upon opening of the circuit breaker 25, the auxiliary switch 27, associated with the circuit breaker, opens the trip coil circuit 28 so that the more or less delicate relay contacts 31 are saved from the destructive effects of arcing. The circuit breakers 15, 15' illustrated in Fig. 2 may also be provided with auxiliary switches for the same purpose. When the circuit breaker 25 opens, the reactance of the current transformer 38 will cause most of the current from current transformer 38' to flow through motor element 36 and although the direction of the current through this element is changed, the direction of its torque is not changed and the disk 33 will tend to remain in contact closing position to the left since the torques of motor elements 35 and 36 are substantially equal. At the instant motor elements 34 and 37 are short circuited, if the difference between the currents is small, motor element 35 may overcome motor element 36 and move the disk 33 counterclockwise, thus tending to cause the disk to oscillate until the difference between the currents becomes sufficiently great. This tendency to oscillate may be prevented by a magnetic damping arrangement associated with the contact-controlling member 45 as illustrated in Fig. 7. This arrangement comprises a magnetic tip portion 51 secured to the contact-controlling member part 49 and arranged to be attracted by a preferably adjustable permanent magnet such as a magnetized screw 52 mounted in a support 53.

Although I have shown and described my invention in considerable detail, I do not wish to be limited to the specific details thereof as shown and described, but may use such modifications, substitutions or equivalents thereof as are embraced within the spirit of my invention.

What I claim as new and desire to secure by Letters Patent of the United States, is:

1. An induction relay, comprising a rotatable disk, electroresponsive means for controlling the movement of said disk comprising a plurality of electro-magnetic torque producing elements, each including an energizing winding and having shaded poles inductively associated with said disk, said elements being arranged to exert opposing torques on the disk irrespective of the relative directions of the currents in the energizing windings thereof, and the material in said disk being so disposed relatively to the poles of said torque producing elements that movement of the disk in response to a difference between the torques exerted by said elements tends to equilibrate said torques, whereby the extent of movement of the disk varies with the ratio of the currents in the energizing windings of said elements.

2. An induction relay comprising relatively movable adjustably positioned cooperating contacts, a disk rotatable in each of two directions to control the movement of said contacts, electroresponsive means for controlling the direction of rotation of said disk comprising a plurality of electromagnetic torque producing elements, each including an energizing winding and having shaded poles inductively associated with the disk, said elements being arranged to exert opposing torques on said disk irrespective of the relative directions of the currents in the windings thereof, and the material of said disk being so disposed relatively to the poles of said torque producing elements that movement of the disk in response to a difference between said torques tends to equilibrate the torques, whereby the ratio of the currents in the energizing windings of said elements necessary to move said disk to contact-controlling position is dependent upon the distance between said relatively movable contacts.

3. An induction relay comprising a rotatable armature, a plurality of motor elements inductively associated with said armature for controlling the movement thereof, one of said elements comprising an energizing winding and being adapted irrespective of the direction of current flow in its winding to exert a torque on said armature tending to turn the same in one direction, and another of said elements comprising an energizing winding and being adapted irrespective of the direction of current flow in its winding to exert a torque on said armature tending to turn the same in the opposite direction, said armature upon movement thereof in response to a difference between said torques being adapted to equilibrate said torques until the intensity of the current in the winding of one of said elements exceeds the intensity of the current in the winding of the other of said elements by an amount substantially directly proportional to the intensity of the current in the winding of the element which exerts the smaller torque.

4. An induction relay comprising relatively movable cooperating contacts, a disk rotatable in each of two directions to control said contacts, electroresponsive means for controlling the direction of rotation of said disk comprising a plurality of electromagnetic torque producing elements, each comprising an energizing winding and having shaded poles inductively associated with the disk, said elements being arranged to exert opposing torques on said disk irrespective of the relative directions of current flow in the windings thereof, the material of said disk being so disposed relatively to the poles of said torque producing elements that movement of the disk in response to a difference between said torques tends to equilibrate the torques so that the disk is moved to contact-controlling position only upon the occurrence of a difference between said torques corresponding to an energizing current in one of said elements exceeding in intensity the energizing current in another of said elements by an amount substantially directly proportional to the smaller current.

5. An induction relay comprising cooperating contacts, a rotatable non-magnetic metal disk for controlling said contacts, a plurality of independent electromagnetic elements for controlling the movement of said disk, each element comprising an energizing winding and having poles inductively associated with the disk, one of said elements beng adapted irrespective of the direction of current flow in the energizing winding thereof to exert a torque on said disk tending to turn the same in one direction and another of said elements being adapted irrespective of the direction of current flow in the energizing winding thereof to exert a torque on said disk tending to turn the same in the opposite direction, the area of the disk adjacent the poles of said elements being reduced so that when said windings are energized, movement of the disk in response to a difference between the torques exerted by said elements decreases the area of the disk adjacent the poles of the element exerting the greater torque and increases the area of the disk adjacent the poles of the element exerting the smaller torque, whereby said disk tends to equilibrate said torques and moves to contact controlling position only upon the occurrence of a difference between said torques corresponding to a current in one of said windings whose intensity exceeds the intensity of the current in the other of said windings by an amount which is substantially directly proportional to the intensity of the smaller current.

6. In protective means for an alternating current electric system wherein the current at one point of the system is balanced against the current at another point of the system, a relay comprising a rotatable armature, a plurality of independent motor elements inductively associated with said armature for controlling the movement thereof, one of said motor elements being constructed and arranged to exert on said armature a torque varying with the intensity of the current at one point of the system and another of said motor elements being constructed and arranged to exert on said armature an opposing torque varying with the intensity of the current at the other point of the system and said armature being adapted to equilibrate said torques until the intensity of the current at one of said points exceeds the intensity of the current at the other of said points by an amount which is substantially directly proportional to the intensity of the smaller current.

7. A protective system comprising two transmission lines, means for interrupting the circuits of said lines, circuit controlling means adapted to be operated to control said interrupting means, a disk rotatable in each of two directions to control said circuit controlling means selectively, a plurality of shaded pole electromagnetic elements inductively associated with said disk and arranged to exert opposing torques thereon, one of said elements comprising an energizing winding in series relation with one of said lines and another of said elements comprising an energizing winding in series relation with the other of said lines, said elements beng adapted upon the occurrence of a change in the intensity of the current in one of said lines such that the ratio of the greater of the currents in the two lines to the smaller thereof exceeds a predetermined value to rotate said disk in a direction to move said circuit controlling means to control the circuit interrupting means in the line carrying the greater current.

8. A protective system comprising two transmission lines, means for interrupting the circuits of said lines, circuit controlling means adapted to be operated to control said interrupting means, a non-magnetic metal disk rotatable in each of two directions to control said circuit controlling means, a plurality of shaded pole electromagnetic elements inductively associated with said disk and arranged to exert opposing torques thereon, one of said elements comprising an energizing winding in series relation with one of said lines and another of said elements comprising an energizing winding in series relation with the other of said lines, whereby the intensity of the torque exerted by each of said elements varies with the intensity of the current in the line with which the winding of the element is associated and whereby the direction and intensity of the resultant torque of said elements is independent of the relative directions of current flow in said lines, the material in said disk being so disposed relatively to the shaded poles of said elements that, upon the occurrence of a change in the intensity of the current in one of said lines, such that the ratio of the greater of the currents in the two lines to the smaller thereof exceeds a predetermined value, said disk is rotated in a direction to move said circuit controlling means to control the circuit interrupting means in the line carrying the greater current.

In witness whereof, I have hereunto set my hand this 12th day of May, 1922.

OLIVER C. TRAVER.